No. 627,836. Patented June 27, 1899.
J. A. WHITE, Jr.
LUMBER MEASURING INSTRUMENT.
(Application filed July 19, 1898.)
(No Model.) 2 Sheets—Sheet 1.
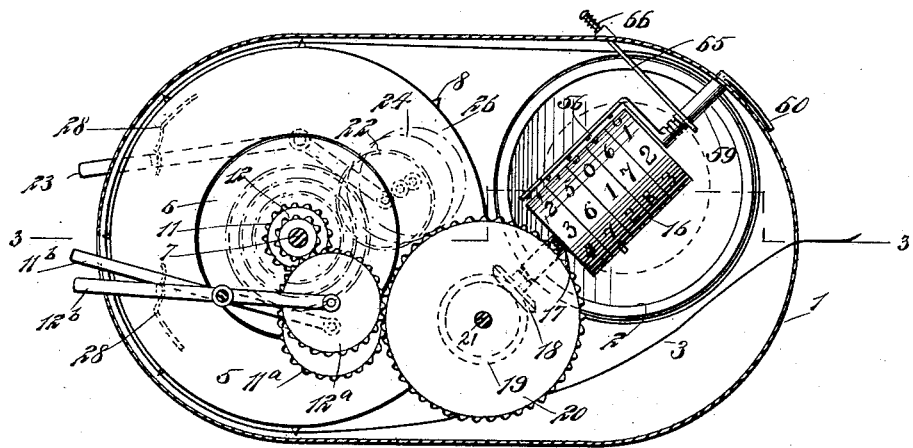
Fig. 1
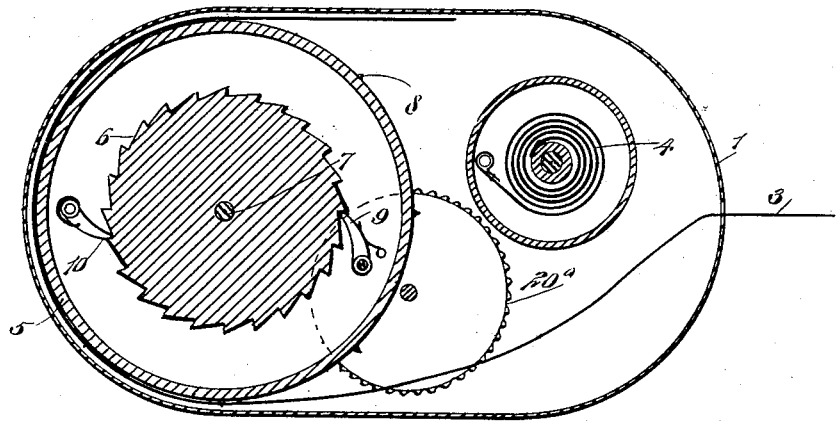
Fig. 2
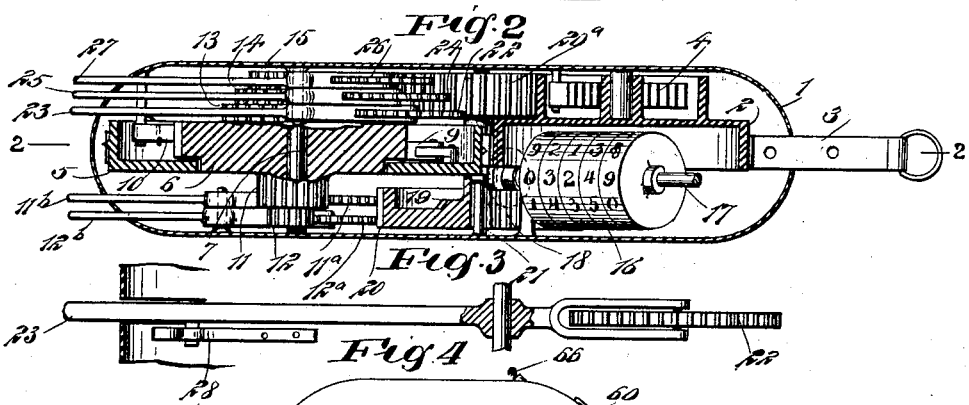
Fig. 3
Fig. 4
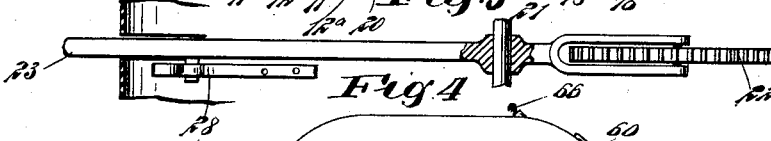
Fig. 5
WITNESSES:
John A. Kingston
C. R. Ferguson
INVENTOR
J. A. White Jr.
BY Munn & Co
ATTORNEYS.
THE NORRIS PETERS CO., PHOTO-LITHO., WASHINGTON, D. C.

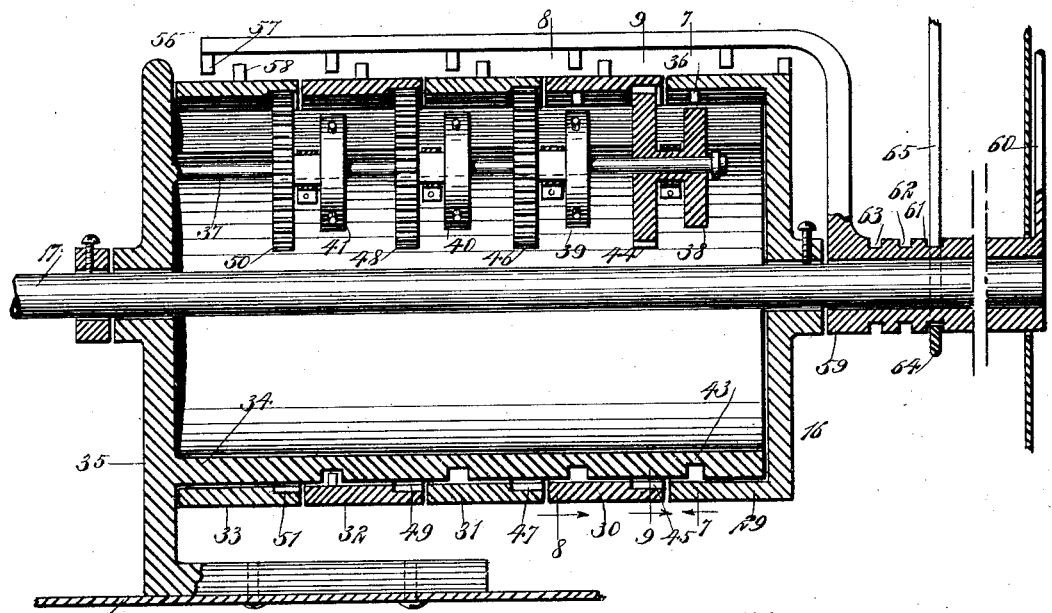

UNITED STATES PATENT OFFICE.

JOSEPH AVERY WHITE, JR., OF WARSAW, ILLINOIS.

LUMBER-MEASURING INSTRUMENT.

SPECIFICATION forming part of Letters Patent No. 627,836, dated June 27, 1899.

Application filed July 19, 1898. Serial No. 686,369. (No model.)

*To all whom it may concern:*

Be it known that I, JOSEPH AVERY WHITE, Jr., of Warsaw, in the county of Hancock and State of Illinois, have invented a new and Improved Lumber-Measuring Instrument, of which the following is a full, clear, and exact description.

This invention relates to instruments for measuring lumber; and the object is to provide a simple instrument by means of which the measurement of any board may be quickly ascertained and also to record the total amount of foot-measure contained in any number of boards of equal or unequal lengths, thus having an accurate measurement without resorting to mental calculation.

I will describe a lumber-measuring instrument embodying my invention and then point out the novel features in the appended claims.

Reference is to be had to the accompanying drawings, forming a part of this specification, in which similar characters of reference indicate corresponding parts in all the views.

Figure 1 is a partial section and partial elevation of a measuring instrument embodying my invention. Fig. 2 is a section on the line 2 2 of Fig. 3. Fig. 3 is a section on the line 3 3 of Fig. 1. Fig. 4 is a plan view of one of a series of shifting devices employed. Fig. 5 is a side view of the instrument. Fig. 6 is a sectional elevation of an adding device employed. Fig. 7 is a section on the line 7 7 of Fig. 6. Fig. 8 is a section on the line 8 8 of Fig. 6, and Fig. 9 is a section on the line 9 9 of Fig. 6.

Referring to the drawings, 1 designates a casing, which as here shown is rounded at its ends. While this form or shape is convenient it is obvious that the casing may be otherwise formed. Arranged within the casing is a winding-drum 2 for the measuring-tape 3. This winding-drum is mounted to rotate on a shaft, and to the hub of the drum 2 one end of a spring 4 is attached. The other end of the spring is attached to a pin extending from the casing. The object of the spring is to automatically turn the drum to draw the tape 3 inward when it is released. The tape 3 extends over a shell-like wheel 5, mounted on the hub of a ratchet-wheel 6, which is mounted to turn on a shaft 7 within the casing.

On the periphery of the wheel 5 is a series of sprockets or teeth 8, designed to engage in holes formed in the tape 3, so that when said tape is drawn outward the wheel 5 will be rotated, and during the rotation of this wheel, as the tape is drawn outward, it is designed to impart a rotary motion to the ratchet-wheel 6. I therefore provide a spring-pressed dog 9, which is pivoted to the shell-like wheel 5 and engages with the teeth of the ratchet-wheel 6. To prevent a backward rotation of the ratchet-wheel, I employ a dog 10, which is pivoted to the casing 1 and engages with the teeth of the ratchet-wheel. The tape 3, as plainly shown in the drawings, extends from the winding-drum 2 around the wheel 5 and out through an opening in the end of the casing.

Attached to the ratchet-wheel 6, at one side, so as to rotate therewith, is a series of gear-wheels 13, 14, and 15, which gradually diminish in size—that is, the gear-wheel 14 is smaller than the wheel 13 and the gear-wheel 15 is smaller than the gear-wheel 14—the object of which will hereinafter appear, and attached to the opposite side of the ratchet-wheel are progressively smaller gear-wheels 11 12.

Arranged in the casing 1 is an adding device 16, the construction of which will be hereinafter clearly described. On the shaft 17 of this adding device is a bevel-pinion 18, meshing with a bevel-gear 19, attached to a gear-wheel 20, mounted to rotate on a shaft 21, and connected to the gear 20 is a gear $20^a$. These two gears are, in effect, a single gear and will be so treated. This gear-wheel 20 $20^a$ may be turned to actuate the actuating-wheel for the adding device, and it is designed to be operated from either one of the gear-wheels 11, 12, 13, 14, or 15. The gear-wheel 13 is designed to be put in connection with the gear $20^a$ by means of a pinion 22, mounted on a lever 23. The gear-wheel 11 is designed to be placed in connection with the gear 20 by means of a pinion $11^a$ on a lever $11^b$. The gear 12 is designed to be placed in connection with the gear 20 by a pinion $12^a$ on a lever $12^b$. The gear-wheel 14 is designed to be put in connection with the gear $20^a$ by means of a pinion 24, mounted on a lever 25. The gear-wheel 15 is designed to be put in engagement with the gear 20ᵃ by means of a pinion 26, mounted on a lever 27. The ends of these several levers extend outward through openings in the casing 1 and each lever may be held in its adjusted position to hold its pinion in connection with the gear-wheels or to hold its pinion out of such connection by means of a spring-clip 28.

The object in making the gear-wheels 11, 12, 13, 14, and 15 of different sizes is to provide for rotating the tumblers of the adding device the required distance, depending upon the width and length of the board to be measured. For instance, if a board sixteen feet long is to be measured the gears 13 and 20 are to be put in connection by the pinion 22. Then by drawing the tape outward the gear 20 will be rotated and cause the tumblers on the adding device to record the number of feet contained in said board or adding the number of feet contained in the board to the measurements formerly taken, and of course this will be carried out in the same manner by the other pinions, depending upon the length of the board—that is, the pinion carried by the lever 23 may be designated as the "eighteen-foot-board pinion," the pinion carried by the lever 25 the "sixteen-foot-board pinion," and the pinion carried by the lever 27 the "fourteen-foot-board pinion," and the pinions 11ᵃ 12ᵃ may be for shorter boards. Obviously while I have shown but five shifting devices or connecting-pinions a greater or less number may be employed without departing from the spirit of my invention. Numbers may be suitably arranged on the outside of the casing to indicate the function of the different levers and their pinions.

I will now describe the construction of an adding device preferably employed.

The adding device comprises a series of sleeves or tumblers 29 30 31 32 33. Each sleeve or tumbler has on its periphery a series of numbers running consecutively from "0" to "9." The tumbler 29 is the units-tumbler; 30, the tens-tumbler; 31, the hundreds-tumbler; 32, the thousands-tumbler, and 33 the tens-of-thousands tumbler. The several tumblers are mounted to rotate around a cylinder 34, which is fixed to a bracket 35, connected to the interior of the casing 1. The cylinder 34 has a longitudinal opening at its top and is open at one end. The shaft 17 has a bearing through the bracket 35, and the units-tumbler 29 is rigidly attached to said shaft at the open end of the cylinder. The other tumblers, however, are not connected directly with the shaft. Each tumbler is provided on its inner side with a pin 36. These pins 36 will be placed in line with the figure "9" or other figure of each tumbler. A spindle 37 is arranged within the cylinder 34, and on this spindle is mounted a series of tappet-wheels 38, 39, 40, and 41. Each tappet-wheel is provided at equidistant points with four tappets or lugs 42, designed to be engaged by the pins 36 of the tumblers, as will be hereinafter described.

It will be noted that the cylinder is provided with exterior annular channels 43 in which the pins 36 move. Attached to the tappet-wheel 38 is a pinion 44, meshing with a rack 45, formed circumferentially in the tumbler 30. Connected to the tappet-wheel 39 is a pinion 46, which engages with a rack 47 in the tumbler 31. Connected to the tappet-wheel 40 is a pinion 48, which meshes with a rack 49 in the tumbler 32, and connected to the tappet-wheel 41 is a pinion 50, which meshes with a rack 51 in the tumbler 33. These tappet-wheels and pinions are of course mounted to rotate freely on the spindle 37; but to prevent their backward movement or, in fact, any accidental movement I have provided retarding devices, (here shown as springs 52 53,) which engage with opposite sides of the square hub or connection 54 between the tappet-wheels and the pinions.

In operation, assuming all the tumblers to be set at zero, and in which position the several naughts will show through the sight-openings 55 in the casing 1, when the tape 3 is drawn outward across or to the width of a board the shaft 17 will be rotated and consequently rotate the units-tumbler. A nearly-complete rotation of this units-tumbler will indicate nine feet measurement, but as a greater number of feet may be contained in the board the tens-tumbler must be rotated one step by the full rotation of the units-tumbler—that is, when the units-tumbler makes its complete rotation its pin 36 will engage with one of the tappets or lugs 42 on the tappet-wheel 38, imparting to said tappet-wheel a quarter-revolution, and this of course will rotate the pinion 44, which will move the tens-tumbler through one space or from "0" to "1." Thus ten feet will be indicated, after which of course the tens-tumbler will remain stationary until the units-tumbler shall have again made a complete rotation, indicating nineteen feet, and then the tens-tumbler is moved one more step with the units-tumbler to indicate twenty feet, and this system is carried out through all the measurements.

With the five tumblers it is obvious that measurements may be taken and added up to one hundred thousand feet; but this may of course be varied by varying the number of tumblers.

As a means for restoring the several tumblers to zero I employ a rod 56, which extends over the several tumblers and has a series of lugs 57, designed to engage with lugs 58, projected from the several tumblers. This shifting-rod 56 is connected to a sleeve 59, loosely mounted on the shaft 17 and extended outward through the casing, where it is provided with a suitable handle 60. The sleeve 59 is provided with a series of annular grooves 61 62 63, in either one of which a stop-lug 64 on a rod 65 is designed to engage. This rod 65 extends outward through the casing and is held normally with the stop-lug 64 in one of the channels by means of a spring 66, arranged between the casing and a button on the end of the rod. When the stop-lug 64 is in the channel 61, the several lugs 57 will be held out of the line of movement of the lugs on the tumblers. When it is desired to set the tumblers to zero, the rod 65 is pushed inward to release the stop-lug from the sleeve. Then the sleeve is to be drawn outward, and after releasing the rod 65 the spring 66 will cause the stop-lug 64 to move into the channel 62. At this time the lugs of all the tumblers excepting the units-tumbler will be in line with lugs on the shifting-bar 56. Then by rotating the sleeve by means of the handle 60 the lugs 57 will engage with the lugs 58 of said tumblers, so that when a complete rotation is given to the sleeve 59 the said tumblers will be set at zero. To set the units-tumbler at zero, the sleeve is drawn farther outward, so that the stop-lug 64 may engage in the channel 63. Then the lug 57 for the units-tumbler will be in line with the movement of the lug on said units-tumbler, and the sleeve is then to be rotated, as before described, to bring said units-tumbler to zero.

By providing means for setting the units-tumbler separately from the others the said means may be used to set all the tumblers through the medium of the units-tumblers to a total measure of a previous day should the device have been disarranged or used by another man in the meantime, thus enabling the first man to continue his additions from the previous number.

Having thus described my invention, I claim as new and desire to secure by Letters Patent—

1. A measuring instrument, comprising a casing, an adding device in the casing, a wheel in the casing, a tape for operating said wheel, a number of gear-wheels of varying sizes adapted to be operated by the said wheel, a gear-wheel for driving the adding device, and means for connecting said gear-wheel with either one of the first-named gear-wheels, substantially as specified.

2. A measuring instrument, comprising a casing, an adding device arranged in the casing and comprising a series of rotary tumblers, a take-up drum in the casing, a sprocket-wheel in the casing, a tape extended from the take-up drum around the sprocket-wheel and out through an opening in the casing, a ratchet-wheel, a spring-pressed dog connection between the ratchet-wheel and the sprocket-wheel, a number of gear-wheels of varying sizes carried by the ratchet-wheel, a gear-wheel for driving the adding-device mechanism, and means for connecting said gear-wheel with either one of the gear-wheels carried by the ratchet-wheel, substantially as specified.

3. A measuring device, comprising a casing, an adding device arranged in the casing and comprising a series of rotary tumblers, a gear-wheel in the casing for operating the shaft of the adding device, to rotate the tumblers, a ratchet-wheel in the casing, gear-wheels of varying sizes carried by the ratchet-wheel, levers in the casing, pinions carried by said levers to connect either one of the gear-wheels carried by the ratchet-wheel with the first-named gear-wheel, a sprocket-wheel surrounding the ratchet-wheel and adapted to rotate the ratchet-wheel when moved in one direction, a take-up drum in the casing, and a tape connected at one end with the said drum and engaging with the teeth of the sprocket-wheel and then passing upward through an opening in the casing, substantially as specified.

4. An adding device, comprising a fixed cylinder, a shaft extended through the cylinder, tumblers mounted to rotate on the cylinder, one of said tumblers being secured to the shaft, a spindle in the cylinder, tappet-wheels mounted on the spindle, gear-wheels on said spindle and engaging with racks formed in certain of the tumblers, a shaft connection between each tappet-wheel and its gear-wheel, the said shaft being angular in cross-section, springs engaging with said shafts, and pins extended from certain of the tumblers to engage tappets or lugs on the tappet-wheels, substantially as specified.

5. An adding device, comprising a fixed cylinder, a series of tumblers mounted to rotate on the cylinder, means for operating the tumblers for the additions, and means, independent of the means for operating the tumbler for addition for setting the several tumblers, and whereby all the tumblers above the units-tumbler may be rotated together and the units-tumbler independently of the other tumbler, substantially as specified.

6. An adding device, comprising a series of rubber tumblers, a shaft supporting the tumblers, a sleeve mounted to rotate on said shaft and also to move longitudinally thereof, a rod or bar attached to said sleeve and extended along the tumblers, the said rod or bar having projections for engaging with projections on the tumblers, and means for holding the sleeve from longitudinal movement when adjusted to the desired position, substantially as specified.

J. AVERY WHITE, Jr.

Witnesses:
LOUISE B. GROVER,
WM. N. GROVER.